(12) United States Patent
Taki et al.

(10) Patent No.: US 7,608,659 B2
(45) Date of Patent: Oct. 27, 2009

(54) CONDUCTIVE MATERIAL MIXED COMPOSITION

(75) Inventors: Takayuki Taki, Tokyo (JP); Atsuo Tomita, Tokyo (JP); Hiroto Asano, Tokyo (JP)

(73) Assignee: Adeka Corporation, Tokyo (JP)

( * ) Notice: Subject to any disclaimer, the term of this patent is extended or adjusted under 35 U.S.C. 154(b) by 0 days.

(21) Appl. No.: 12/140,530

(22) Filed: Jun. 17, 2008

(65) Prior Publication Data

US 2009/0072204 A1    Mar. 19, 2009

Related U.S. Application Data

(62) Division of application No. 11/703,689, filed on Feb. 8, 2007, now abandoned.

(30) Foreign Application Priority Data

Feb. 9, 2006    (JP)    ............... 2006-032989

(51) Int. Cl.
*C08K 3/04*    (2006.01)
*C08L 39/04*    (2006.01)
(52) U.S. Cl. .................. 524/495; 524/502; 524/538; 524/555; 524/556
(58) Field of Classification Search ......... 524/495, 524/502, 538, 555, 556
See application file for complete search history.

(56) References Cited

FOREIGN PATENT DOCUMENTS

JP    2001-210314    8/2001
JP    2002-313344    10/2002

OTHER PUBLICATIONS

Kamachi, M. et al., "Electron Exchange Phenomena of Polymers Containing Nitroxyl Radicals" Polymer Journal, vol. 14, No. 5, pp. 363-369 (1982).

Kurosaki, T. et al., "Polymers Having Stable Radicals. I. Synthesis of Nitroxyl Polymers from 4-Methacryloyl Derivatives of 2,2,6,6-Tetramethylpiperidine" Journal of Polymer Science, vol. 10, 3295-3310 (1972).

*Primary Examiner*—Helen L. Pezzuto
(74) *Attorney, Agent, or Firm*—Young & Thompson

(57) ABSTRACT

A conductive material mixed composition obtained by synthesizing a piperidyl group-containing high-molecular-weight polymer or copolymer that is composed of the constitutional unit represented by general formula (1) below and insoluble in tetrahydrofuran (THF) by polymerization in a liquid phase, immediately followed by mixing a conductive material with the polymer or copolymer in the liquid phase:

(1)

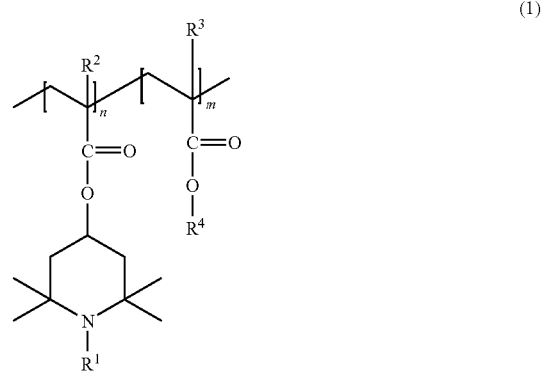

wherein $R^1$ represents a hydrogen atom, a hydroxyl group, an oxyl radical, an alkyl group having 1 to 18 carbon atoms, or an alkoxy group having 1 to 18 carbon atoms; $R^2$ and $R^3$ each independently represent a hydrogen atom or a methyl group; $R^4$ represents a hydrogen atom, an alkali metal atom, an alkyl group having 1 to 50 carbon atoms, an alkenyl group having 1 to 50 carbon atoms, an alkyl group having 1 to 50 carbon atoms, or a haloalkyl group having 1 to 50 carbon atoms; n represents a number of not less than 30; and m represents 0 or a positive number.

6 Claims, No Drawings

CONDUCTIVE MATERIAL MIXED COMPOSITION

This application is a Divisional of U.S. application Ser. No. 11/703,689, filed Feb. 8, 2007, now abandoned.

TECHNICAL FIELD

The present invention relates to a conductive material mixed composition in which a conductive material is mixed with a piperidyl group-containing high-molecular-weight polymer or copolymer, and more particularly, relates to a conductive material mixed composition excellent in conductivity that is obtained by mixing a conductive material with a reaction solution in which a piperidyl group-containing high-molecular-weight polymer or copolymer has just been prepared by anionic polymerization.

BACKGROUND ART

A piperidyl group-containing polymer, especially a nitroxide radical-containing polymer is known to be stable under various conditions and used as a weatherability improver for resins, a stabilizer or an electrode material for secondary batteries, or the like. Nitroxide radical-containing polymers produced by radical polymerization are described in Polym. J., 14(5), 363 (1982) and Japanese Patent Laid-Open Publication No. 2002-313344, while a nitroxide radical-containing polymer produced by anionic polymerization is described in J. Polym. Sci., Polym. Chem. Ed., 10, 3295 (1972).

However, there have been problems that the radical polymerization had difficulty in controlling the molecular weight and its distribution and that in conventional anionic polymerization, the yield was low and high-molecular-weight polymers could not be obtained. Another problem was that, since these polymers had almost no conductivity in themselves, addition of a large amount of a conductive material was required when used as positive electrode materials for batteries.

Japanese Patent Laid-Open Publication No. 2001-210314 proposes adding a polymeric hindered amine, in which a hindered amine moiety is incorporated in a (meth)acrylic ester unit, to a positive electrode, a negative electrode, or a separator. For such (meth)acrylic ester-based polymer containing a hindered amine moiety, however, a low-molecular-weight polymer had high solubility to electrolytes whereas when powder of high-molecular-weight polymer was mixed with carbon to prepare a positive electrode material, the effect largely varied from material to material; therefore, both the cases were impractical.

DISCLOSURE OF THE INVENTION

Accordingly, an object of the present invention is to provide a composition in which a piperidyl group-containing high-molecular-weight polymer or copolymer and a conductive material are homogeneously mixed, the composition that is conveniently used as a conductive material.

As the results of extensive studies to achieve the above objective, the present inventors have found that there may be obtained a homogeneously mixed composition of a piperidyl group-containing high-molecular-weight polymer and a conductive material by preparing the said polymer by anionic polymerization in a liquid phase and subsequent mixing the conductive material in the said polymer dispersed in the said liquid phase and that this composition is excellent in conductivity.

The present invention is accomplished based on the above finding and provides a conductive material mixed composition obtained by a method by synthesizing a piperidyl group-containing high-molecular-weight polymer or copolymer composed of the constitutional unit represented by general formula (1) below and insoluble in tetrahydrofuran (THF) by polymerization in a liquid phase, immediately followed by mixing a conductive material with the polymer or copolymer in the liquid phase.

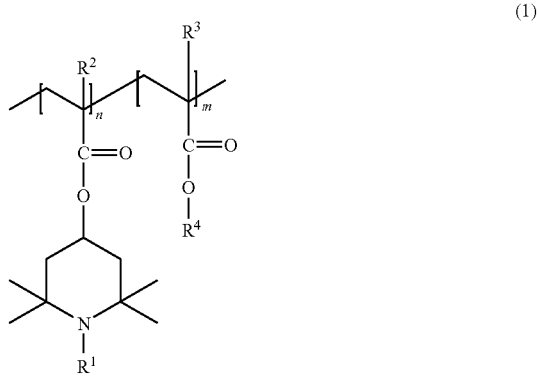

(1)

wherein $R^1$ represents a hydrogen atom, a hydroxyl group, an oxyl radical, an $C_{1-18}$ alkyl group having 1 to 18 carbon atoms, or an $C_{1-18}$ alkoxy group having 1 to 18 carbon atoms; $R^2$ and $R^3$ each independently represent a hydrogen atom or a methyl group, $R^4$ represents a hydrogen atom, an alkali metal atom, an $C_{1-50}$ alkyl group having 1 to 50 carbon atoms, an $C_{1-50}$ alkenyl group having 1 to 50 carbon atoms, an $C_{1-50}$ aralkyl group having 1 to 50 carbon atoms, or a $C_{1-50}$ haloalkyl group having 1 to 50 carbon atoms; n represents a number of 30 or greater; and m represents 0 or a positive number).

BEST MODE FOR CARRYING OUT THE INVENTION

Hereinafter, the present invention summarized above will be explained in detail.

In general formula (1), the $C_{1-18}$ alkyl group having 1 to 18 carbon atoms represented by $R^1$ includes methyl, ethyl, propyl, isopropyl, butyl, sec-butyl, t-butyl, isobutyl, amyl, isoamyl, t-amyl, hexyl, cyclohexyl, heptyl, isoheptyl, t-heptyl, n-octyl, isooctyl, t-octyl, 2-ethylhexyl, nonyl, isononyl, decyl, dodecyl (lauryl), tridecyl, tetradecyl (myristyl), pentadecyl, hexadecyl (palmityl), heptadecyl, octadecyl (stearyl), and the like.

The $C_{1-18}$ alkoxy group having 1 to 18 carbon atoms represented by $R^1$ includes alkoxy groups derived from the above alkyl groups.

In general formula (1), the $C_{1-50}$ alkyl group having 1 to 50 carbon atoms represented by $R^4$ includes methyl, ethyl, propyl, isopropyl, butyl, sec-butyl, t-butyl, isobutyl, amyl, isoamyl, t-amyl, hexyl, cyclohexyl, heptyl, isoheptyl, t-heptyl, n-octyl, isooctyl, t-octyl, 2-ethylhexyl, nonyl, isononyl, decyl, dodecyl (lauryl), tridecyl, tetradecyl (myristyl), pentadecyl, hexadecyl (palmityl), heptadecyl, octadecyl (stearyl), eicosyl, heneicosyl, docosyl, tricosyl, tetracosyl, pentacosyl, hexacosyl, heptacosyl, octacosyl, nonacosyl, triacontyl (myricyl, melisyl), and the like. The $C_{1-50}$ aralkyl group having 1 to 50 carbon atoms represented by $R^4$ includes phenylmethyl (benzyl), 1-phenylethyl, 2-phenylethyl, 1-phenyl-1-methylethyl, and the like. The $C_{1-50}$ alkenyl group having 1 to 50 carbon atoms represented by $R^4$ includes alkenyl groups corresponding to the above alkyl groups such as vinyl, 1-methylethenyl, 2-methylethenyl, propenyl, butenyl, isobutenyl, pentenyl, hexenyl, heptenyl, octenyl, decenyl, pentadecenyl, eicosenyl, and tricosenyl. The alkali metal represented by $R^4$ includes lithium, sodium, potassium, and the like. The $C_{1-50}$ haloalkyl group having 1 to 50 carbon atoms represented by $R^4$ includes groups in which a hydrogen atom in the above $C_{1-50}$ alkyl group having 1 to 50 carbon atoms is replaced by a halogen atom.

As a preferred high-molecular-weight polymer (or copolymer) composed of the constitutional unit represented by general formula (1), there may be specifically mentioned polymers (copolymers) No. 1 to No. 9 composed of the following constitutional units.

Polymer (or copolymer j
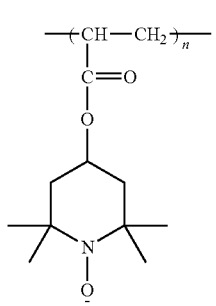

Polymer (or copolymer j
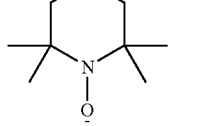

Polymer (or copolymer j
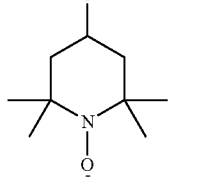

Polymer (or copolymer jNo.4
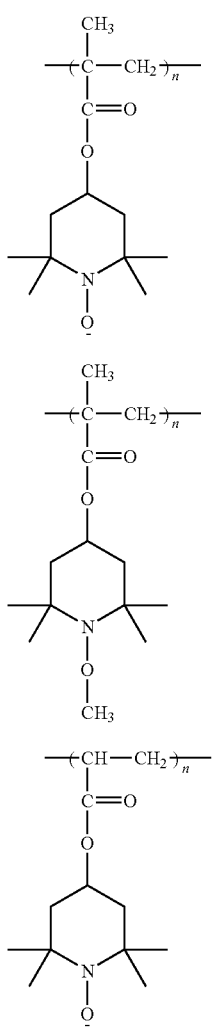

Polymer (or copolymer jNo.5
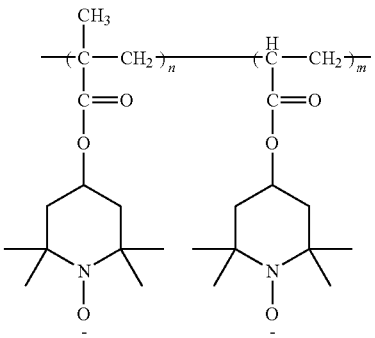

-continued

Polymer (or copolymer jNo.6
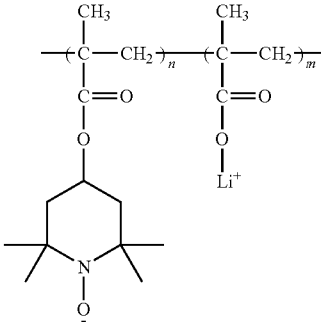

Polymer (or copolymer jNo.7
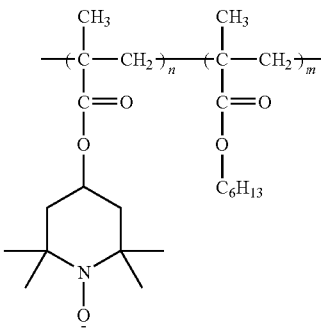

Polymer (or copolymer jNo.8
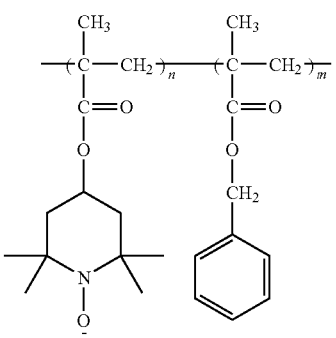

-continued

Polymer (or copolymer jNo.9

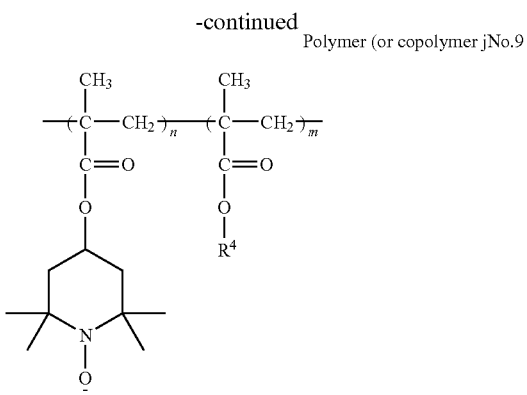

The piperidyl group-containing high-molecular-weight polymer (or copolymer) relating to the present invention is insoluble in tetrahydrofuran (THF). The plausible reasons are the high degree of polymerization, the high crystallinity due to high stereoregularity of the polymer main-chain, the crosslinking through copolymerization with a crosslinker for increasing the molecular weight, and the like.

The piperidyl group-containing high-molecular-weight polymer (or copolymer) relating to the present invention may be a crosslinked polymer or copolymer composed of the constitutional unit represented by general formula (1) prepared by additionally using copolymerizable crosslinker in the copolymerization.

Such copolymerizable crosslinker includes di(meth)acrylates such as ethylene glycol di(meth)acrylate, diethylene glycol di(meth)acrylate, propylene glycol di(meth)acrylate, glycerin di(meth)acrylate, tetraethylene glycol di(meth)acrylate, ethylene di(meth)acrylate, 2,4-pentanediol di(meth) acrylate, 1,6-hexanediol di(meth)acrylate, glycidyl di(meth) acrylate, and bisphenol A di(meth)acrylate; bis(meth) acrylamides such as N,N'-methylenebisacrylamide; and divinyl compounds such as divinylbenzene, divinyltoluene, butadiene, 1,4-pentadiene, and 1,5-hexadiene. Of these, di(meth)acrylates are preferred.

The copolymerizable crosslinker may be used in an amount of typically 0 to 10% by mass and preferably 0 to 5% by mass based on the total amount of moieties composed of the constitutional unit represented by general formula (1) in the piperidyl group-containing high-molecular-weight polymer or copolymer relating to the present invention.

The piperidyl group-containing high-molecular-weight polymer or copolymer relating to the present invention can be produced by anionic polymerization of a monomer such as 4-methacryloyloxy-2,2,6,6-tetramethylpiperidine-1-oxyl (TMA) in a solvent such as toluene using a polymerization initiator such as a Grignard reagent.

The polymerization initiator to be used in the anionic polymerization may be selected from typical initiators for anionic polymerization, which include alkali metal such as lithium, sodium, potassium, and cesium; organic derivatives of alkali metal such as an alkylate, allylate, or arylate of alkali metal; organic derivatives of alkaline earth metal such as an alkylate, allylate, or arylate of alkaline earth metal; organoaluminum compounds; Grignard reagents; sodium amide, metal hydroxides; and alfin catalysts. These polymerization initiators may be used alone or as a mixture of two or more. Grignard reagents are especially preferably used. The polymerization initiator is preferably used at a ratio of 0.01 to 0.5 moles per mole of the monomer.

Organic derivatives of alkali metal used as the polymerization initiator include ethyllithium, n-butyllithium, sec-butyllithium, t-butyllithium, ethylsodium, n-butylsodium, lithium biphenylide, lithium naphthalenide, lithium triphenylide, sodium naphthalenide, potassium, naphthalenide, α-methylstyrene dianion sodium salt, 1,1-diphenylhexyllithium, 1,1-diphenyl-3-methylpentyllithium, 1,4-dilithio-2-butene, 1,6-dilithiohexane, polystyryllithium, cumylpotassium, cumylcesium, diphenylmethylsodium, diphenylmethylpotassium, diphenylmethyllithium, 1,1-diphenylhexyllithium, 1,1-diphenyl-3-methylpentyllithium, and the like.

Organic derivatives of alkaline earth metal used as the polymerization initiator include n-butylmagnesium, n-hexylmagnesium, ethoxycalcium, calcium stearate, t-butoxystrontium, ethoxybarium, isopropoxybarium, ethylmercaptobarium, t-butoxybarium, phenoxybarium, barium diethylamide, barium stearate, barium salt of ketyl, and the like.

Organoaluminum compounds used as the polymerization initiator include alkylaluminums such as trimethylaluminum, triethylaluminum, tripropylaluminum, triisobutylaluminum, and trihexylaluminum; alkylaluminum chlorides such as dimethylaluminum chloride, diethylaluminum chloride, dipropylaluminum chloride, diisobutylaluminum chloride, dihexylaluminum chloride, methylaluminum dichloride, ethylaluminum dichloride, propylaluminum dichloride, isobutylaluminum dichloride, and hexylaluminum dichloride; alkylaluminum hydrides such as dimethylaluminum hydride, diethylaluminum hydride, dipropylaluminum hydride, diisobutylaluminum hydride, and dihexylaluminum hydride; and alkylaluminum alkoxides (or phenoxides) such as methylbis(2,6-di-t-butylphenoxy)aluminum, ethylbis(2,6-di-t-butylphenoxy)aluminum, and isobutylbis(2,6-di-t-butyl-4-methylphenoxy)aluminum.

As Grignard reagents used as the polymerization initiator, which are generally represented by general formula (2) below, preferred examples include t-butylmagnesium chloride, t-butylmagnesium bromide, phenylmagnesium bromide, cyclopentylmagnesium chloride, n-butylmagnesium chloride, n-butylmagnesium bromide, s-butylmagnesium chloride, s-butylmagnesium bromide, i-butylmagnesium chloride, i-butylmagnesium bromide, i-propylmagnesium chloride, i-propylmagnesium bromide, and the like.

$$R\text{---}MgX \quad (2)$$

wherein R represents an alkyl group, a cycloalkyl group, an aryl group, an alkylaryl group, or the like, which may be substituted; and X represents a chlorine atom, a bromine atom, an iodine atom, or the like.

As the solvent for the anionic polymerization, there may be used any solvent that is inert for the polymerization and compatible with the polymer or copolymer without particular limitation. Specifically, such solvent includes ethers such as diethyl ether, tetrahydrofuran, dioxane, and trioxane; saturated hydrocarbons such as pentane, cyclopentane, n-hexane, cyclohexane, methylcyclohexane, heptane, octane, decane, and dodecane; aromatic hydrocarbons such as toluene, benzene, xylene, and ethylbenzene; and halogenohydrocarbons such as chloroform, of which tetrahydrofuran and toluene are especially preferred. These solvents may be used alone or as a mixture of two or more. When such solvent is used, its amount may be adjusted as appropriate accordingly to the type of polymerization initiator to be used, the molecular weight of desired polymer or copolymer, the type of solvent, and the like; generally, the preferred amount of solvent is 200 to 3000 parts by mass relative to 100 parts by mass of the total amount of monomers considering smooth progress of the reaction and the like.

In the anionic polymerization, it is recommended to prevent moisture from entering into the reaction system as much as possible. Accordingly, it is preferred that, for any chemicals supplied in the system including a monomer and other optional chemicals (for example, organic solvent), the moisture contents are reduced to be as low as possible. For that purpose, these chemicals may be degassed and dehydrated prior to use where necessary. In addition, the reaction is preferably carried out under an atmosphere of inert gas such as nitrogen, argon, or helium.

The anionic polymerization is preferably carried out in such a manner that the condition is uniform in the reaction system, for example, by sufficient stirring.

In the anionic polymerization, the temperature of reaction system may be suitably selected, without particular limitation, according to the types of polymerization initiator and monomer and the like; however, it is preferably $-100°$ C. to $50°$ C. and more preferably $-20°$ C. to $20°$ C. The reaction time is typically between 110 seconds and 72 hours.

In the present invention, the type of conductive material to be mixed with the piperidyl group-containing high-molecular-weight polymer or copolymer includes a carbon material or a conductive polymer. The carbon material includes carbon black such as acetylene black, Ketjen black, and graphite fine particles; fine particles of amorphous carbon such as needle coke or the like; carbonaceous materials such as carbon nanofiber, graphite, carbon nanotube, and amorphous carbon; and the like.

The conductive polymer includes polyaniline, polypyrrol, polythiophene, polyacetylene, polyacene, and the like. Among these, carbon materials are preferred, and acetylene black and Ketjen black are especially suitably used.

For mixing the piperidyl group-containing high-molecular-weight polymer (or copolymer) relating to the present invention and a conductive material, there may be employed a method in which the conductive material is mixed with the polymerization solution where the piperidyl group-containing high-molecular-weight polymer (or copolymer) has just been prepared by anion polymerization and is dissolved in a solvent such as toluene and xylene. If the piperidyl group-containing high-molecular-weight polymer (or copolymer) is isolated and then tried to mix with the conductive material, the isolated polymer (or copolymer) will be insoluble in a solvent and hence difficult to mix with the conductive material. Even if the isolated polymer (or copolymer) is forced to mix with the conductive material by heating, the composition will be ultimately gelled and difficult to take out as a homogeneous mixture.

In the present invention, the mass ratio of the piperidyl group-containing high-molecular-weight polymer (or copolymer) to the conductive material in the composition is, as represented by former/latter, preferably 99/1 to 10/90, more preferably 90/10 to 30/70, and further preferably 85/15 to 50/50.

The mixed composition of the present invention, which contains the above piperidyl group-containing high-molecular-weight polymer (or copolymer) and the above conductive material, is useful for application as a conductive material. The composition is suitably used, for example, as a positive electrode active material of a nonaqueous electrolyte secondary battery, although application thereof is not limited.

The above-mentioned nonaqueous electrolyte secondary battery is a secondary battery comprising a positive electrode, a negative electrode, a separator, and a nonaqueous electrolyte. In such battery, electrode materials are used for the positive and negative electrodes. As the positive electrode, there is used a sheet-shaped body prepared by applying a slurry, in which a positive electrode active material, a binder, and a conductive material are suspended in an organic solvent or water, to a collector and subsequently drying. The positive electrode active material may contain, besides the piperidyl group-containing high-molecular-weight polymer (or copolymer) relating to the present invention, as necessary, a material selected from $TiS_2$, $TiS_3$, $MoS_3$, $FeS_2$, $Li_{(1-x)}MnO_2$, $Li_{(1-x)}Mn_2O_4$, $Li_{(1-x)}CoO_2$, $Li_{(1-x)}NiO_2$, $LiV_2O_3$, $V_2O_5$, and the like, wherein x denotes a number of 0 to 1. Among these positive electrode active materials other than the piperidyl group-containing high-molecular-weight polymer (or copolymer) relating to the present invention, preferable is a complex oxide of lithium and a transition metal such as $LiCoO_2$, $LiNiO_2$, $LiMn_2O_4$, $LiMnO_2$, $LiV_2O_3$, and $LiFePO_4$. The binder for the positive electrode active materials includes, for example, but not limited to, polyvinylidene fluoride, polytetrafluoroethylene, EPDM, SBR, NBR, fluoro rubber, and the like.

As the negative electrode, there is generally used a sheet-shaped body prepared by applying a slurry, in which a negative electrode active material and a binder are suspended in an organic solvent or water, to a collector and subsequently drying. The negative electrode active material includes inorganic substances such as lithium, lithium alloy, and tin compounds, carbonaceous materials, conductive polymers, and the like. Especially preferable are carbonaceous materials that can store and release lithium ion, which is high in safety. The carbonaceous material includes, but not limited to, graphite and petroleum-based coke, coal-based coke, carbonized petroleum-based pitch, carbonized coal-based pitch, carbonized materials of resin (phenol resin, crystalline cellulose, etc.), and the like, carbon materials obtained by partial carbonization thereof, furnace black, acetylene black, pitch-based carbon fiber, PAN-based carbon fiber, and the like. The binder for the negative electrode active material includes binders similar to those for the positive electrode active material listed above.

Besides the conductive material contained in the conductive material mixed composition of the present invention, an additional conductive material for a positive electrode may be blended, if needed. As such conductive material, there may be used, but not limited to, carbon black such as graphite fine particles, acetylene black, and Ketjen black, fine particles of amorphous carbon such as needle coke, carbon nanofiber, and the like. Especially preferably used are acetylene black and Ketjen black. As a solvent used for slurrying, an organic solvent that can dissolve the binder is typically used. Non-limiting examples of such organic solvent include N-methylpyrrolidone, dimethylfomamide, dimethylacetamide, methyl ethyl ketone, cyclohexanone, methyl acetate, methyl acrylate, diethylenetriamine, N,N-dimethylaminopropylamine, ethylene oxide, tetrahydrofuran, and the like.

As the collector for the negative electrode, typically used are copper, nickel, stainless steel, nickel plated steel, and the like, whereas as the collector for the positive electrode, typically used are aluminum, stainless steel, nickel-plated steel, and the like.

As the separator, any conventional microporous polymer film may be used without particular limitation. Such film includes, for example, films made of a polymer mainly composed of polyethylene, polypropylene, polyvinylidene fluoride, polyvinylidene chloride, polyacrylonitrile, polyacrylamide, polytetrafluoroethylene, polysulfone, polyethersulfone, polycarbonate, polyamide, polyimide, polyethers such as polyethylene oxide and polypropylene oxide, celluloses such as carboxymethylcellulose and hydroxypropylcellulose, poly(meth)acrylic acid and esters thereof, or the like; a derivative thereof; or a copolymer or mixture thereof. One of these films may be used alone or a plurality thereof may be laminated to use as a multi-layer film. Such film may further contain various additives without particular limitation on type and content thereof. Among these films, preferably used is a film made of polyethylene, polypropylene, polyvinylidene fluoride, or polysulfone.

These films have micropores allowing electrolyte to infiltrate therein so that ions can readily pass through the film. The method for fabricating a microporous film includes "phase separation method" in which a film is formed from a solution containing a polymer and a solvent under such conditions that microphase separation can take place and then the solvent is removed by extraction to make micropores, and "drawing method" in which a film is formed by extruding a molten polymer with high draft and subsequently the film is annealed to align the crystals in one direction and then drawn to make voids between the crystals, which serve as micropores. The method is selected according to the film material used.

The mixed composition of the present invention, which contains the piperidyl group-containing high-molecular-weight polymer (or copolymer) and the conductive material, may further contain, according to its applications, a commonly used additive or the like, such as a hindered amine light stabilizer (HALS), an ultraviolet absorber, a phosphorus-containing, phenolic, or sulfur-containing antioxidant, a nucleating agent, a flame retardant, a metal soap, a processing aid, a filler, a dispersant, an emulsifier, a lubricant, a coloring dye, a coloring pigment, an antistatic agent, a preservative, an antibacterial agent, a fungicide, a plasticizer, an antifoaming agent, a viscosity modifier, a leveling agent, a surfactant, a fluorescent brightener, a pH adjuster, a thickener, an anticoagulation agent, and a perfume.

The hindered amine light stabilizer includes for example, 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, bis (1,2,2,6,6,-pentamethyl-4-piperidyl) sebacate, bis(1-octoxy-2,2,6,6-tetramethyl-4-piperidyl) sebacate, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, bis(2,2,6,6-tetramethyl-4-piperidyl).bis (tridecyl)-1,2,3,4-butanetetracarboxylate, bis(1,2,2,6,6-pentamethyl-4-piperidyl).bis(tridecyl)-1,2,3,4-butanetetracarboxylate, bis(1,2,2,6,6-pentamethyl-4-piperidyl)-2-butyl-2-(3,5-di-t-butyl-4-hydroxybenzyl) malonate, 1-(2-hydroxyethyl)-2,2,6,6-tetramethyl-4-piperidinol/diethyl succinate polycondensate, 1,6-bis(2,2,6,6-tetramethyl-4-piperidylamino)hexane/dibromoethane polycondensate, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino) hexane/2,4-dichloro-6-t-octylamino-s-triazine polycondensate, 1,5,8,12-tetrakis[2,4-bis(N-butyl-N-(2,2,6,6-tetramethyl-4-piperidyl)amino)-s-triazin-6-yl]-1,5,8,12-tetraazadodecane, 1,5,8,12-tetrakis[2,4-bis(N-butyl-N-(1,2,2,6,6-pentamethyl-4-piperidyl)amino)-s-triazin-6-yl]-1,5,8,12-tetraazadodecane, 1,6,11-tris[2,4-bis(N-butyl-N-(2,2,6,6-tetramethyl-4-piperidyl)amino-s-triazin-6-ylamino] undecane, 1,6,11-tris[2,4-bis(N-butyl-N-(1,2,2,6,6-pentamethyl-4-piperidyl)amino-s-triazin-6-ylamino] undecane, 3,9-bis[1,1-dimethyl-2-{tris(2,2,6,6-tetramethyl-4-piperidyloxycarbonyloxy)butylcarbonyloxy}ethyl]-2,4,8,10-tetraoxaspiro[5.5]undecane, 3,9-bis[1,1-dimethyl-2-{tris (1,2,2,6,6-pentamethyl-4-piperidyloxycarbonyloxy) butylcarbonyloxy}ethyl]-2,4,8,10-tetraoxaspiro[5.5] undecane, and the like.

The ultraviolet absorber includes, for example, 2-hydroxybenzophenones such as 2,4-dihydroxybenzophenone, 2-hydroxy-4-methoxybenzophenone, 2-hydroxy-4-octoxybenzophenone, and 5,5'-methylenebis(2-hydroxy-4-methoxybenzophenone); 2-(2-hydroxyphenyl) benzotriazoles such as 2-(2-hydroxy-5-methylphenyl) benzotriazole, 2-(2-hydroxy-5-t-octylphenyl)benzotriazole, 2-(2-hydroxy-3,5-di-t-butylphenyl)-5-chlorobenzotriazole, 2-(2-hydroxy-3-t-butyl-5-methylphenyl)-5-chlorobenzotriazole, 2-(2-hydroxy-3,5-dicumylphenyl)benzotriazole, 2,2'-methylenebis(4-t-octyl-6-benzotriazolylphenol), polyethylene glycol ester of 2-(2-hydroxy-3-t-butyl-5-carboxyphenyl) benzotriazole, 2-[2-hydroxy-3-(2-aeryloyloxyethyl)-5-methylphenyl]benzotriazole, 2-[2-hydroxy-3-(2-methacryloyloxyethyl)-5-t-butylphenyl]benzotriazole, 2-[2-hydroxy-3-(2-methacryloyloxyethyl)-5-t-octylphenyl] benzotriazole, 2-[2-hydroxy-3-(2-methacryloyloxyethyl)-5-t-butylphenyl]-5-chlorobenzotriazole, 2-[2-hydroxy-5-(2-methacryloyloxyethyl)phenyl]-benzotriazole, 2-[2-hydroxy-3-t-butyl-5-(2-methacryloyloxyethyl)phenyl]benzotriazole, 2-[2-hydroxy-3-t-amyl-5-(2-methacryloyloxyethyl)phenyl] benzotriazole, 2-[2-hydroxy-3-t-butyl-5-(3-methacryloyloxypropyl)phenyl]-5-chlorobenzotriazole, 2-[2-hydroxy-4-(2-methacryloyloxymethyl)phenyl]benzotriazole, 2-[2-hydroxy-4-(3-methacryloyloxy-2-hydroxypropyl)phenyl] benzotriazole, and 2-[2-hydroxy-4-(3-methacryloyloxypropyl)phenyl]benzotriazole; 2-(2-hydroxyphenyl)-4,6-diaryl-1,3,5-triazines such as 2-(2-hydroxy-4-methoxyphenyl)-4,6-diphenyl-1,3,5-triazine, 2-(2-hydroxy-4-hexyloxyphenyl)-4,6-diphenyl-1,3,5-triazine, 2-(2-hydroxy-4-octoxyphenyl)-4,6-bis(2,4-dimethylphenyl)-1,3,5-triazine, 2-[2-hydroxy-4-(3-($C_{12-13}$-mixed alkoxy)-2-hydroxypropoxy)phenyl]-4,6-bis(2,4-dimethylphenyl)-1,3,5-triazine, 2-[2-hydroxy-4-(2-acryloyloxyethoxy)phenyl]-4,6-bis(4-methylphenyl)-1,3,5-triazine, 2-(2,4-dihydroxy-3-allylphenyl)-4,6-bis(2,4-dimethylphenyl)-1,3,5-triazine, and 2,4,6-tris(2-hydroxy-3-methyl-4-hexyloxyphenyl)-1,3,5-triazine; benzoates such as phenyl salycilate, resorcinol monobenzoate, 2,4-di-t-butylphenyl-3, 5-di-t-butyl-4-hydroxybenzoate, octyl (3,5-di-t-butyl-4-hydroxy)benzoate, dodecyl (3,5-di-t-butyl-4-hydroxy)benzoate, tetradecyl (3,5-di-t-butyl-4-hydroxy)benzoate, hexadecyl (3,5-di-t-butyl-4-hydroxy)benzoate, octadecyl (3,5-di-t-butyl-4-hydroxy)benzoate, and behenyl (3,5-di-t-butyl-4-hydroxy)benzoate; substituted oxanilides such as 2-ethyl-2'-ethoxyoxanilide and 2-ethoxy-4'-dodecyloxanilide; cyanoacrylates such as ethyl-α-cyano-β,β-diphenylacrylate and methyl-2-cyano-3-methyl-3-(p-methoxyphenyl) acrylate; and metal salts and metal chelates, especially salts or chelates of nickel or chromium; and the like.

The phosphorous-containing antioxidant includes, for example, triphenyl phosphite, tris(2,4-di-t-butylphenyl) phosphite, tris(2,5-di-t-butylphenyl)phosphate, tris(nonylphenyl)phosphite, tris(dinonylphenyl)phosphite, tris (mono,di-mixed nonylphenyl)phosphite, diphenyl acid phosphite, 2,2'-methylenebis(4,6-di-t-butylphenyl)octyl phosphite, diphenyl decyl phosphite, diphenyl octyl phosphite, di(nonylphenyl)pentaerythritol diphosphite, phenyl diisodecyl phosphite, tributyl phosphite, tris(2-ethylhexyl) phosphite, tridecyl phosphite, trilauryl phosphite, dibutyl acid phosphite, dilauryl acid phosphite, trilauryltrithio phosphite, bis(neopentyl glycol)-1,4-cyclohexane dimethyl diphosphite, bis(2,4-di-t-butylphenyl)pentaerythritol diphosphite, bis(2,5-di-t-butylphenyl)pentaerythritol diphosphite, bis(2,6-di-t-butyl-4-methylphenyl)pentaerythritol diphosphite, bis(2,4-di-cumylphenyl)pentaerythritol diphosphite, distearyl pentaerythritol diphosphite, tetra($C_{12-15}$-mixed alkyl)-4,4'-isopropylidenediphenyl phosphite, bis[2,2'-methylenebis(4,6-diamylphenyl)].isopropylidenediphenyl phosphite, tetra(tridecyl).4,4'-butylidenebis(2-t-butyl-5-methylphenol)diphosphite, hexa(tridecyl).1,1,3-tri s(2-methyl-5-t-butyl-4-hydroxyphenyl)butane triphosphite, tetrakis(2,4-di-t-butyphenyl)biphenylene diphosphonite, tris(2-[(2,4,7,9-tetrakis-t-butyldibenzo[d,f][1,3,2]dioxaphosphepin-6-yl)oxy]ethyl)amine, 9,10-dihydro-9-oxa-10-phosphaphenanthrene-10-oxide, 2-butyl-2-ethylpropanediol.2,4,6-tri-t-butylphenol monophosphite, and the like.

The phenolic antioxidant includes, for example, 2,6-di-t-butyl-p-cresol, 2,6-diphenyl-4-octadecyloxyphenol, stearyl (3,5-di-t-butyl-4-hydroxyphenyl)propionate, distearyl (3,5-di-t-butyl-4-hydroxybenzyl)phosphonate, tridecyl (3,5-di-t-butyl-4-hydroxybenzyl)thioacetate, thiodiethylenebis[(3,5-di-t-butyl-4-hydroxyphenyl)propionate], 4,4'-thiobis(6-t-butyl-m-cresol), 2-octylthio-4,6-di(3,5-di-t-butyl-4-hydroxyphenoxy)-s-triazine, 2,2'-methylenebis(4-methyl-6-t-butylphenol), bis[3,3-bis(4-hydroxy-3-t-butylphenyl) butyric acid]glycol ester, 4,4'-butylidenebis(2,6-di-t-butylphenol), 4,4'-butylidenebis(6-t-butyl-3-methylphenol), 2,2'-ethylidenebis(4,6-di-t-butylphenol), 1,1,3-tris(2-methyl-4-hydroxy-5-t-butylphenyl)butane, bis[2-t-butyl-4-methyl-6-(2-hydroxy-3-t-butyl-5-methylbenzyl)phenyl]terephthalate, 1,3,5-tris(2,6-dimethyl-3-hydroxy-4-t-butylbenzyl) isocyanurate, 1,3,5-tris(3,5-di-t-butyl-4-hydroxybenzyl) isocyanurate 1,3,5-tris(3,5-di-t-butyl-4-hydroxybenzyl)-2,4,6-trimethylbenzene, 1,3,5-tris[(3,5-di-t-butyl-4-hydroxyphenyl)propionyloxyethyl]isocyanurate, tetrakis[3-(3',5'-di-t-butyl-4'-hydroxyphenyl)propionyloxymethyl] methane, 2-t-butyl-4-methyl-6-(2-acroyloxy-3-t-butyl-5-methylbenzyl)phenol, 3,9-bis[2-(3-t-butyl-4-hydroxy-5-methylhydrocinnamoyloxy)-1,1-dimethylethyl]-2,4,8,10-tetraoxaspiro[5.5]undecane, triethylene glycol bis[β-(3-t-butyl-4-hydroxy-5-methylphenyl)propionate], and the like.

The sulfur-containing antioxidant includes, for example, dialkyl thiodipropionates such as dilauryl thiodipropionate, dimyristyl thiodipropionate, myristyl stearyl thiodipropionate, and distearyl thiodipropionate; and β-alkylmercaptopropionic esters of polyol such as pentaerythritol tetra(β-dodecylmercaptopropionate).

EXAMPLES

Hereinafter, the present invention will be described in detail with reference to Examples and Comparative Examples, but the present invention is not limited by these examples.

Example 1

To a 2-L four-necked flask equipped with a stirrer were charged 135 g (0.563 mol) of 4-methacryloyloxy-2,2,6,6-tetramethylpiperidine-1-oxyl (TMA), 6.75 g (0.034 mol) of ethylene glycol di(meth)acrylate, 1.35 g (0.008 mol) of n-hexyl methacrylate, and 780 ml of dry toluene under a nitrogen atmosphere, and the content was cooled to −10° C. To the flask was added 14.0 ml (0.028 mol) of 2M ether solution of cyclopentylmagnesium chloride slowly and dropwise so that the internal temperature did not exceed −5° C., The mixture was stirred at −10° C. for 5 hours and then stirred at room temperature for additional 5 hours. To the reaction solution were added 34 g of acetic acid and 34 g of methanol to quench the catalyst, and then 28.6 g of Ketjen black was added. The mixture was stirred until it became a homogeneous slurry. The slurry was added dropwise to 10 L of water/methanol (1/9) mixed solvent while stirring. After the resultant mixture was stirred for 30 minutes, the solid was collected by filteration and dried to obtain 143 g of deep gray powder (conductive material mixed composition of the present invention).

Assuming 100% recovery of Ketjen black added, the yield of piperidyl group-containing high-molecular-weight polymer was 80%, and the content of Ketjen black was 20% by mass in the composition of the present invention.

Example 2

To a 2-L four-necked flask equipped with a stirrer were charged 135 g (0.563 mol) of 4-methacryloyloxy-2,2,6,6-tetramethylpiperidine-1-oxyl (TMA), 4.09 g (0.017 mol) of diethylene glycol di(meth)acrylate, 1.35 g (0.008 mol) of benzyl methacrylate, and 780 ml of dry toluene under a nitrogen atmosphere, and the content was cooled to ~10° C. To the flask was added 9.4 ml (0.028 mol) of 3M ether solution of phenylmagnesium bromide slowly and dropwise so that the internal temperature did not exceed ~5° C. The mixture was stirred at ~10° C. for 5 hours and then at room temperature for additional 5 hours. To the reaction solution were added 34 g of acetic acid and 34 g of methanol to quench the catalyst, and then 28.6 g of acetylene black was added. The mixture was stirred until it became a homogeneous slurry. The slurry was added dropwise to 10 L of water/methanol (1/9) mixed solvent while stirring. After the resultant mixture was stirred for 30 minutes, the solid was collected by filtration and dried to obtain 127 g of deep gray powder (conductive material mixed composition of the present invention).

Assuming 100% recovery of acetylene black added, the yield of piperidyl group-containing high-molecular-weight polymer was 70%, and the content of acetylene black was 23% by mass in the composition of the present invention.

Example 3

To a 2-L four-necked flask equipped with a stirrer was charged 127 g (0.563 mol) of 4-acryloyloxy-2,2,6,6-tetramethylpiperidine-1-oxyl (TA), 3.64 g (0.017 mol) of diethylene glycol diacrylate, 2.60 g (0.008 mol) of stearyl acrylate, and 780 ml of dry toluene under a nitrogen atmosphere, and the content was cooled to −10° C. To the flask was added 14 ml (0.028 mol) of 2M ether solution of s-butylmagnesium chloride slowly and dropwise so that the internal temperature did not exceed −5° C., The resultant mixture was stirred at −10° C. for 5 hours and then at room temperature for additional 5 hours. To the reaction solution were added 34 g of acetic acid and 34 g of methanol to quench the catalyst, and then 25.2 g of acetylene black was added. The mixture was stirred until it became a homogeneous slurry. The slurry was added dropwise to 10 L of water/methanol (1/9) mixed solvent while stirring. After the resultant mixture was stirred for 30 minutes, the solid was collected by filtration and dried to obtain 105 g of deep gray powder (conductive material mixed composition of the present invention).

Assuming 100% recovery of acetylene black added, the yield of piperidyl group-containing high-molecular-weight polymer was 60%, and the content of acetylene black was 24% by mass in the composition of the present invention.

Comparative Example 1

After the same anionic polymerization as Example 1 was carried out, to the reaction solution were added 34 g of acetic acid and 34 g of methanol to quench the catalyst, and without adding a conductive material (Ketjen black), the resultant mixture was added dropwise to 10 L of water/methanol (1/9) mixed solvent while stirring. After the resultant mixture was stirred for 30 minutes, the solid was collected by filtration and dried to obtain 113 g of orange powder (piperidyl group-containing high-molecular-weight polymer). The yield of piperidyl group-containing high-molecular-weight polymer obtained was 79%. This powder was completely insoluble in toluene or THF even with heating. Therefore, the powder was dispersed in 2 L of NMP and dissolved with heating to 100° C. To the resulting solution was added 28.6 g of Ketjen black, and the mixture was vigorously stirred to form a homogeneous slurry. The slurry was, however, gelled when cooled. Consequently, the gel was again heated to 100° C. to make a slurry, which was added dropwise to 10 L of water/methanol (1/9) mixed solvent before the temperature lowered. When added, the slurry was highly viscous, and after addition, the solid was not dispersed in the mixed solvent but precipitated as clay-like agglomerate; thus, the desired material could not be obtained as powder.

From the results of Examples 1 to 3, it was confirmed that a homogeneous composition containing a piperidyl group-containing high-molecular-weight polymer or copolymer and a conductive material can be obtained by mixing said conductive material in a reaction solution in which said piperidyl group-containing high-molecular-weight polymer or copolymer has just been synthesized by anionic polymerization. On the contrary, as shown by the results of Comparative Example 1, when an isolated piperidyl group-containing high-molecular-weight polymer was mixed with a conductive material, the piperidyl group-containing high-molecular-weight polymer was not homogeneously mixed with the conductive material because of the lack of solubility to solvents, and it was impossible to take out the mixture as powder.

INDUSTRIAL APPLICABILITY

According to the present invention, there may be efficiently provided a homogeneous mixed composition with excellent conductivity containing a piperidyl group-containing high-molecular-weight polymer (or copolymer) and a conductive material by synthesizing the piperidyl group-containing high-molecular-weight polymer (or copolymer) by polymerization in a liquid phase, immediately followed by mixing the conductive material with the polymer or copolymer in the liquid phase.

What is claimed is:

1. A process of producing a conductive material mixed composition comprising the step of synthesizing a piperidyl group-containing high-molecular-weight polymer or copolymer that is composed of the constitutional unit represented by general formula (1) below and insoluble in tetrahydrofuran (THF) by polymerization in a solvent so that the synthesized polymer or copolymer is dissolved in the solvent, and immediately followed by mixing a conductive material with the polymer or copolymer dissolved in the solvent to form a homogeneous mixture:

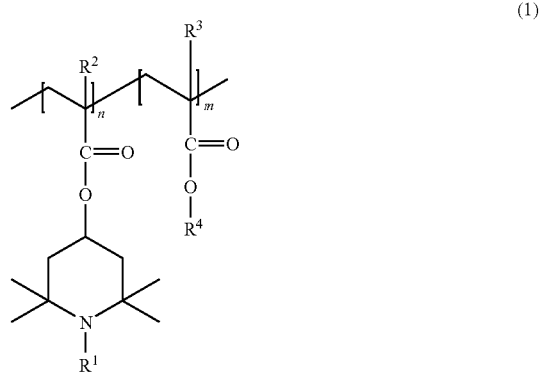

(1)

wherein $R^1$ represents a hydrogen atom, a hydroxyl group, an oxyl radical, an alkyl group having 1 to 18 carbon atoms, or an alkoxy group having 1 to 18 carbon atoms; $R^2$ and $R^3$ each independently represent a hydrogen atom or a methyl group; $R^4$ represents a hydrogen atom, an alkali metal atom, an alkyl group having 1 to 50 carbon atoms, an alkenyl group having 1 to 50 carbon atoms, an aralkyl group having 1 to 50 carbon atoms, or a haloalkyl group having 1 to 50 carbon atoms; n represents a number of 30 or greater; and m represents 0 or a positive number.

2. The process according to claim 1, wherein the conductive material is a carbon material.

3. The process according to claim 2, wherein the carbon material is selected from acetylene black and Ketjen black.

4. The process according to claim 1, wherein the mass ratio of the piperidyl group-containing high-molecular-weight polymer or copolymer to the conductive material is, as represented by former/latter, in the range of 99/1 to 10/90.

5. The process according to claim 1, wherein the mass ratio of the piperidyl group-containing high-molecular-weight polymer or copolymer to the conductive material is, as represented by former/latter, in the range of 90/10 to 30/70.

6. The process according to claim 1, wherein the mass ratio of the piperidyl group-containing high-molecular-weight polymer or copolymer to the conductive material is, as represented by former/latter, in the range of 85/15 to 50/50.

* * * * *